US009405754B1

(12) United States Patent
McGuire

(10) Patent No.: US 9,405,754 B1
(45) Date of Patent: Aug. 2, 2016

(54) SYSTEM AND METHOD FOR PRODUCT OPTIMIZATION

(75) Inventor: Mike McGuire, Dallas, TX (US)

(73) Assignee: Andrews Distributing Company, LLC, Dallas, TX (US)

( * ) Notice: Subject to any disclaimer, the term of this patent is extended or adjusted under 35 U.S.C. 154(b) by 222 days.

(21) Appl. No.: 13/565,287

(22) Filed: Aug. 2, 2012

Related U.S. Application Data

(60) Provisional application No. 61/515,758, filed on Aug. 5, 2011.

(51) Int. Cl.
*G06F 17/00* (2006.01)
*G06F 17/30* (2006.01)
*G06Q 30/02* (2012.01)

(52) U.S. Cl.
CPC .... *G06F 17/30067* (2013.01); *G06F 17/30286* (2013.01); *G06Q 30/0202* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 7,937,286 | B2 * | 5/2011 | Newman et al. ............. | 705/7.31 |
| 2003/0033194 | A1 * | 2/2003 | Ferguson et al. ............... | 705/10 |
| 2003/0033587 | A1 * | 2/2003 | Ferguson et al. ............. | 717/104 |
| 2005/0043011 | A1 * | 2/2005 | Murray et al. ................. | 455/405 |
| 2005/0055275 | A1 * | 3/2005 | Newman et al. ................ | 705/14 |
| 2005/0256778 | A1 * | 11/2005 | Boyd et al. ........................ | 705/26 |
| 2008/0270363 | A1 * | 10/2008 | Hunt et al. .......................... | 707/3 |
| 2008/0288889 | A1 * | 11/2008 | Hunt et al. ..................... | 715/810 |
| 2008/0294996 | A1 * | 11/2008 | Hunt et al. ..................... | 715/739 |
| 2008/0319829 | A1 * | 12/2008 | Hunt et al. ....................... | 705/10 |
| 2009/0030829 | A1 * | 1/2009 | Chatter et al. .................. | 705/37 |
| 2009/0106100 | A1 * | 4/2009 | Mashinsky ...................... | 705/14 |
| 2011/0191140 | A1 * | 8/2011 | Newman et al. ............. | 705/7.31 |

* cited by examiner

*Primary Examiner* — Gurkanwaljit Singh
(74) *Attorney, Agent, or Firm* — Winstead PC

(57) ABSTRACT

A method includes maintaining product sales information according to a data model. The data model includes a consumer-demographics naming convention, a retail-provider-type naming convention, and a product-naming convention. The maintaining includes indexing the product sales information by consumer-demographics information, by retail-provider-type information, and by product-categorization information. The method further includes receiving raw sales information and translating the raw sales information into the data model. In addition the method includes storing the translated raw sales information as part of the product sales information. Furthermore, the method includes receiving a request for aggregation of at least a portion of the product sales information. The request specifies an intersection of the product-categorization information, the consumer-demographic information, and the retail-provider-type information. The method also includes, responsive to the request, aggregating the at least a portion of the product sales information.

18 Claims, 12 Drawing Sheets

SYSTEM AND METHOD FOR PRODUCT OPTIMIZATION

CROSS-REFERENCE TO RELATED APPLICATIONS

This application claims priority from, and incorporates by reference the entire disclosure of, U.S. Provisional Application No. 61/515,758 filed on Aug. 5, 2011.

BACKGROUND

1. Technical Field

The present invention relates generally to sales optimization and more particularly, but not by way of limitation, to systems and methods for optimizing product sales via a plurality of naming conventions.

2. History of Related Art

Most product supply chains include a manufacturer or producer of a product, a plurality of retail providers that provide the product for sale, and a consumer who ultimately receives the product. In industries involving supply chains for goods, it is common for the product supply chain to further include a distributor that distributes products from the manufacturer to retail providers. Although individual entities in product supply chains each benefit from optimizing products for improved sales, in a competitive marketplace, specific sales data on which to base product optimization is generally not available.

In addition, sales of a given product can vary significantly based on many factors that include consumer demographics and a type of retail provider offering the given product for sale. For example, consumers living in an urban environment may have a proclivity for different categories of products than consumers living in a rural environment. In a similar fashion, a given product may sell far better in some types of retail providers (e.g., grocery stores) than in others (e.g., convenience stores). However, retail providers, manufacturers or producers, and distributors often cannot reliably determine, in advance, which products will sell best at a particular retail provider, or, alternatively, which retail providers are good choices for placement of a product in the marketplace.

Current optimization methods apply product optimization in an ad hoc manner based on, for example, domain knowledge of an individual or raw projections that are not adequately supported by actual sales data. Therefore, current methods are not optimal for purposes of applying product optimization in a consistent and repeatable manner.

SUMMARY OF THE INVENTION

In one embodiment, a method includes, in a product analytics database, maintaining product sales information according to a data model. The data model includes a consumer-demographics naming convention, a retail-provider-type naming convention, and a product-naming convention. The maintaining includes indexing the product sales information by consumer-demographics information pursuant to the consumer-demographics naming convention, by retail-provider-type information pursuant to the retail-provider-type naming convention, and by product-categorization information pursuant to the product-naming convention. The method further includes receiving, by a server computer, raw sales information and translating, by the server computer, the raw sales information into the data model. In addition the method includes storing the translated raw sales information as part of the product sales information. Furthermore, the method includes receiving, by the server computer, a request for aggregation of at least a portion of the product sales information. The request specifies an intersection of the product-categorization information, the consumer-demographic information, and the retail-provider-type information. The method also includes, responsive to the request, the server computer aggregating the at least a portion of the product sales information.

In one embodiment, a system includes a product analytics database that maintains product sales information. The product sales information is maintained according to a data model that includes a consumer-demographics naming convention, a retail-provider-type naming convention, and a product-naming convention. The product sales information is indexed by consumer-demographics information pursuant to the consumer-demographics naming convention, by retail-provider-type information pursuant to the retail-provider-type naming convention, and by product-categorization information pursuant to the product-naming convention. The system further includes a server computer in data communication with the product analytics database. The server computer is operable to receive raw sales information, translate the raw sales information into the data model, and store the translated raw sales information as part of the product sales information. The server computer is further operable to receive a request for aggregation of at least a portion of the product sales information. The request specifies an intersection of the product-categorization information, the consumer-demographics information, and the retail-provider-type information. In addition, responsive to the request, the server computer is operable to aggregate the at least a portion of the product sales information.

In one embodiment, a computer-program product includes a computer-usable medium having computer-readable program code embodied therein. The computer-readable program code adapted to be executed to implement a method. The method includes, in a product analytics database, maintaining product sales information according to a data model. The data model includes a consumer-demographics naming convention, a retail-provider-type naming convention, and a product-naming convention. The maintaining includes indexing the product sales information by consumer-demographics information pursuant to the consumer-demographics naming convention, by retail-provider-type information pursuant to the retail-provider-type naming convention, and by product-categorization information pursuant to the product-naming convention. The method further includes receiving, by a server computer, raw sales information and translating, by the server computer, the raw sales information into the data model. In addition the method includes storing the translated raw sales information as part of the product sales information. Furthermore, the method includes receiving, by the server computer, a request for aggregation of at least a portion of the product sales information. The request specifies an intersection of the product-categorization information, the consumer-demographic information, and the retail-provider-type information. The method also includes, responsive to the request, the server computer aggregating the at least a portion of the product sales information.

The above summary of the invention is not intended to represent each embodiment or every aspect of the present invention.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, inventive principles described herein enable improved organization and categorization of sales data that can be leveraged to the benefit of stakeholders throughout product supply chains. For purposes of this patent application, a product is a good or a service that is ultimately provided or marketed to a consumer. In various embodiments, a data model for expressing product sales is established that utilizes a product-naming convention to describe categories of products, a consumer-demographics naming convention to describe categories of consumers, and a retail-provider-type naming convention to describe categories of retail providers. In various embodiments, sales data stored according to the data model may be leveraged by stakeholders such as, for example, retail providers, manufacturers, and distributors, to optimize placement of products in a competitive marketplace.

Figure 1:
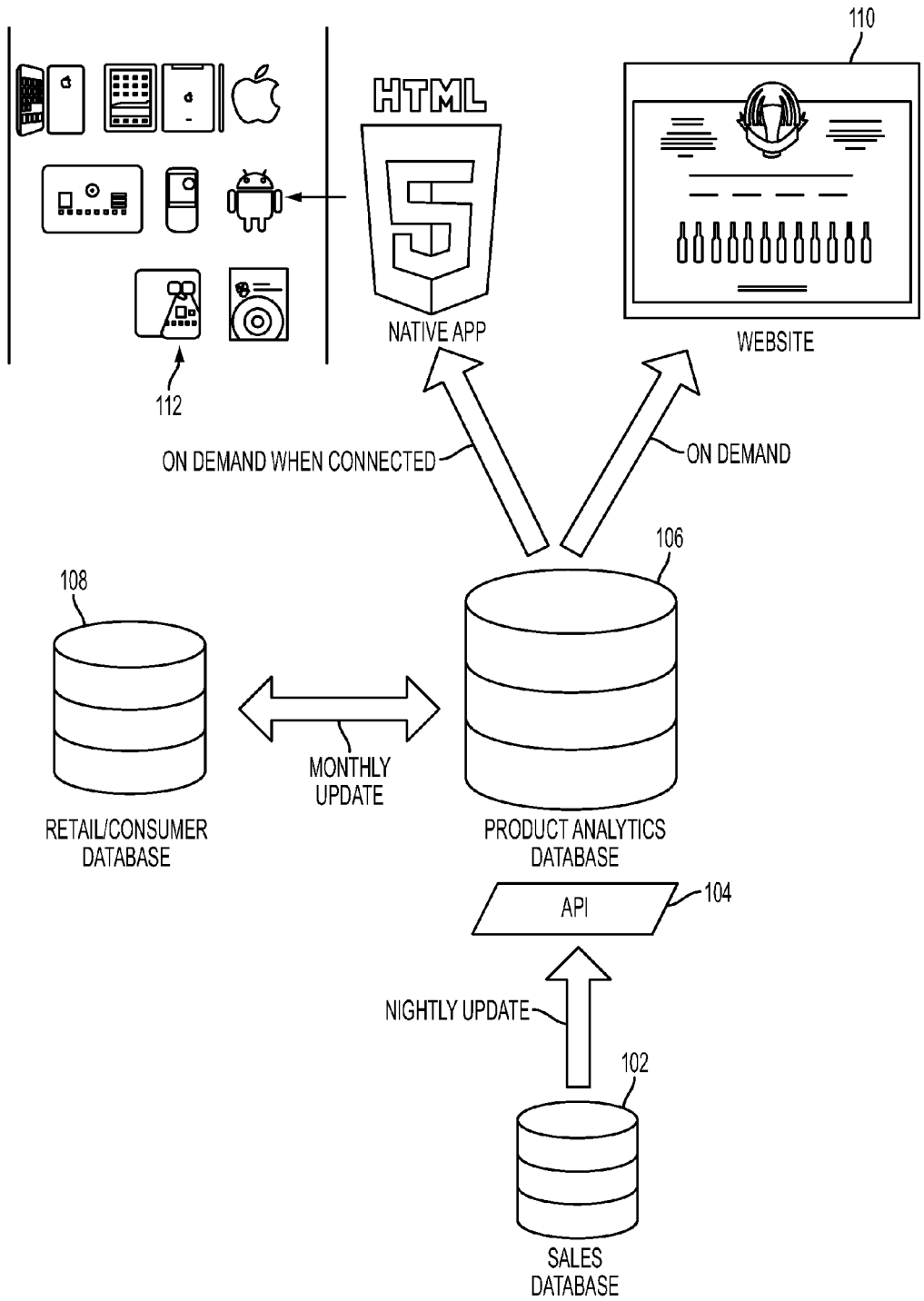
FIG. 1 illustrates a product-optimization system.

FIG. 1 illustrates a product-optimization system 100. The product-optimization system 100 includes a sales database 102, a product analytics database 106, an application programming interface (API) 104 provided by the product analytics database 106, a retail/consumer database 108, a plurality of client computing devices 112, and a website 110. In a typical embodiment, as described in more detail below, the product-optimization system 100 utilizes a pre-established naming convention for each of consumer demographics (i.e., a consumer-demographics naming convention), retail-provider type (i.e., a retail-provider-type naming convention), and products (i.e., a product-naming convention). In a typical embodiment, functionality attributed to the sales database 102 or the product analytics database 106 may be performed by server computers coupled to and in data communication therewith. In this fashion, the sales database 102 and the product analytics database 106 are each defined to include server computers that maintain and operate on the sales database 102 and the product analytics database 106, respectively.

In a typical embodiment, the product analytics database 106 implements a data model that conforms to the pre-established naming conventions of the product-optimization system 100, that is, the product-naming convention, the consumer-demographics naming convention, and the retail-provider-type naming convention. In various embodiments, the pre-established naming conventions may be expressed as a tree structure. Via the data model, the product analytics database 106 maintains sales information by retail-provider-type category, by product category, and by consumer-demographics category. In that way, the product analytics database 106 is typically operable to aggregate sales information by any combination of one or more consumer-demographics categories, one or more retail-provider-type categories, and one or more product categories. In a typical embodiment, the product analytics database 106 thereby drives the optimization functionality of the product-optimization system 100. In various embodiments, the product analytics database 106 may represent a single database as illustrated or be representative of a plurality of product analytics databases in a distributed environment.

In a typical embodiment, the sales database 102 is a source for raw sales information. In a typical embodiment, the raw sales information identifies product sales by retail provider and product but is not necessarily stored by the sales database 102 in conformance to the data model of the product analytics database 106. Rather, via the API 104, the raw sales information is translated into the data model of the product analytics database 106. The API 104 may provide access to the product analytics database 106, for example, via an open database connectivity (ODBC) interface.

In a typical embodiment, the sales database 102 belongs to a stakeholder in a product supply chain. For example, in various embodiments, the sales database 102 may be a database belonging to a distributor (or a plurality of distributors) that distributes products from manufacturers to retail providers that are the distributor's customers. In these embodiments, the sales database 102 may provide raw sales information that comprehensively describes, for the distributor's customers, sales of products that the distributor distributes. By way of further example, in various embodiments, the sales database 102 may be a database of a manufacturer that provides, for example, raw sales information that comprehensively describes sales of the manufacturer's products. Although the sales database 102 is illustrated singly, in various embodiments, the sales database 102 may be representative of a plurality of sales databases. For example, the sales database 102 may represent a plurality of databases from a plurality of retail providers that have agreed to share sales information, for example, in exchange for access to optimization features of the product-optimization system 100.

The retail/consumer database 108 typically maintains information on retail providers in a two-fold fashion. First, the retail providers may be identified according to the consumer-demographics naming convention. In various embodiments, each of the retail providers may be placed into one of a plurality of categories indicative of consumer demographics in a geographical area served by the retail providers. Second, the retail providers may be identified according to the retail-provider-type naming convention. In various embodiments, each of the retail providers may be placed into one of a plurality of categories indicative of a type of retail provider (e.g., grocery store, convenience store, etc.). In a typical embodiment, the retail/consumer database 108 is intended to be comprehensive and is regularly updated to include new retail providers. In various embodiments, information from the retail/consumer database 108 may be offered as a service by a third-party service provider.

In operation, the product analytics database 106 receives raw sales information from the sales database 102 via the API 104. In various embodiments, the raw sales information may be received at regular intervals (e.g., daily). The raw sales information typically identifies sales by product and by retail provider. The API 104 allows the product analytics database 106 to accept raw sales information from databases that store data according to diverse data formats. Via the API 104, the raw sales information is translated into the data model of the product analytics database 106. As described above, the sales database 102 may represent a single database as illustrated or be representative of a plurality of sales databases that all provide raw sales information to the product analytics database 106.

The product analytics database 106 receives consumer-demographics information and retail-provider-type information from the retail/consumer database 108. For example, in various embodiments, the product analytics database 106 provides the retail/consumer database 108 information related to each retail provider identified by the sales information maintained therein. The retail/consumer database 108 typically responds with a consumer-demographics category (according to the consumer-demographics naming convention) and a retail-provider-type category (according to the retail-provider-type naming convention) for each retail provider. In that way, the product analytics database 106 may maintain the sales information in conformance with the consumer-demographics naming convention and the retail-provider-type naming convention in addition to the product-naming convention. The product analytics database 106 may request and receive consumer-demographics information and retail-provider-type information at regular intervals such as, for example, monthly.

In a typical embodiment, the product-optimization system 100 is portable across industries. For example, the product-optimization system 100 may be implemented in the beverage industry to describe beverages and sales of beverages at restaurants, grocery stores, and the like. By way of further example, the product-optimization system 100 may be implemented in other industries to describe sales of food products, automobiles, electronics, and other products. One of ordinary skill in the art will appreciate that the product-optimization system 100 may be utilized in any industry by substituting an appropriate product-naming convention, an appropriate retail-provider-type naming convention, and an appropriate consumer-demographics naming convention. In some embodiments, the product analytics database 106 may be maintained by a distributor of products and the product-optimization system 100 may be provided by the distributor as a service to manufacturers/producers and retail providers.

As will be described in more detail below with respect to the ensuing figures, the product analytics database 106 is operable to serve reports and analytics to the plurality of client computing devices 112. In various embodiments, the client computing devices 112 may include desktop computers, laptop computers, tablet computers, smartphones, and other appropriate client computing devices 112. Reports and analytics may be served on demand, for example, via the website 110, via a native application designed for a particular client platform, or via an HTML5 application.

Figure 2:
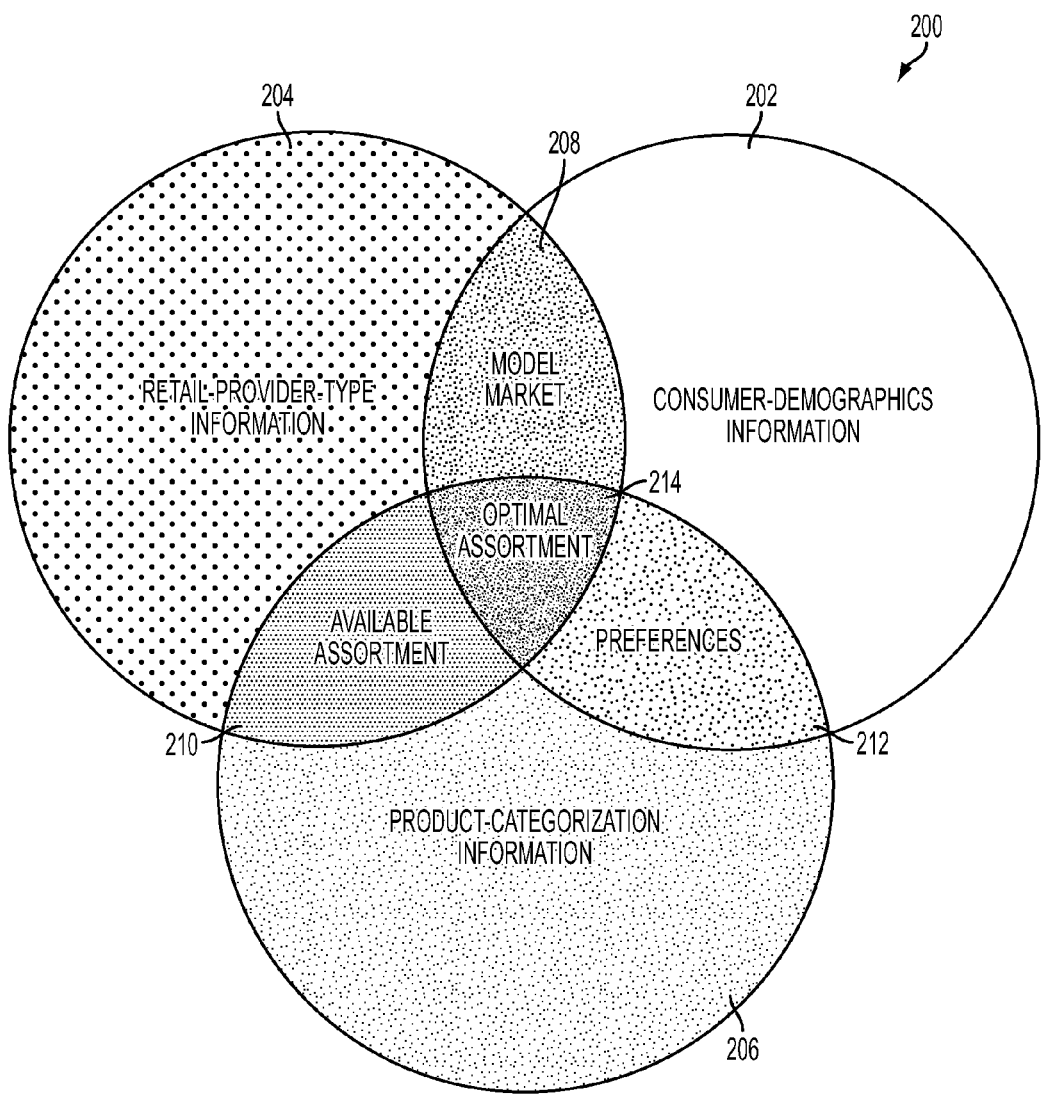
FIG. 2 is a Venn graph that illustrates product optimization.

FIG. 2 is a Venn graph 200 that illustrates product optimization via a product analytics database such as, for example, the product analytics database 106 of FIG. 1. The Venn graph 200 illustrates strategic relationships that may be established between consumer-demographics information 202, retail-provider-type information 204, and product-categorization information 206. In various embodiments, an objective of product optimization is to optimize the placement of products in a competitive marketplace. For example, for a retail provider, product optimization may involve identifying products that are most likely to sell well given a retail-provider type of the retail provider and consumer demographics of a geographical area served by the retail provider. By way of further example, for a manufacturer or producer of products, product optimization may involve identifying retail providers that represent opportunities for improving product sales.

In a typical embodiment, a product optimization may be initiated via selection of a model market 208. As used herein, a model market is a selection of one or more consumer-demographics categories and one or more retail-provider-type categories. As illustrated in the Venn graph 200, the model market 208 may be expressed as an intersection of the retail-provider-type information 204 and the consumer-demographics information 202. For example, the model market 208 may encompass convenience stores (i.e., a retail-provider-type category) in a suburban setting (i.e., a consumer-demographics category).

In a typical embodiment, an intersection of the retail-provider-type information 204 and the product-categorization information 206 represents an available assortment of products 210 from which a retail provider may select to offer for sale to consumers. In a typical embodiment, an intersection of the consumer-demographics information 202 and the product-categorization information 206 represents an ability of the product analytics database 106 of FIG. 1 to maintain product-category preferences 212 for consumer-demographics categories.

In a typical embodiment, selection of the model market 208 enables identification of an optimal assortment 214 of products to be sold or marketed to the model market 208. The optimal assortment 214 is reflected in the Venn graph 200 as an intersection of the consumer-demographics information 202, the retail-provider-type information 204, and the product-categorization information 206. In other words, the optimal assortment 214 generally includes a strategic subset of the available assortment of products 210 that the product-category preferences 212 indicate are preferred by consumer demographics in the model market 208.

Figure 3:
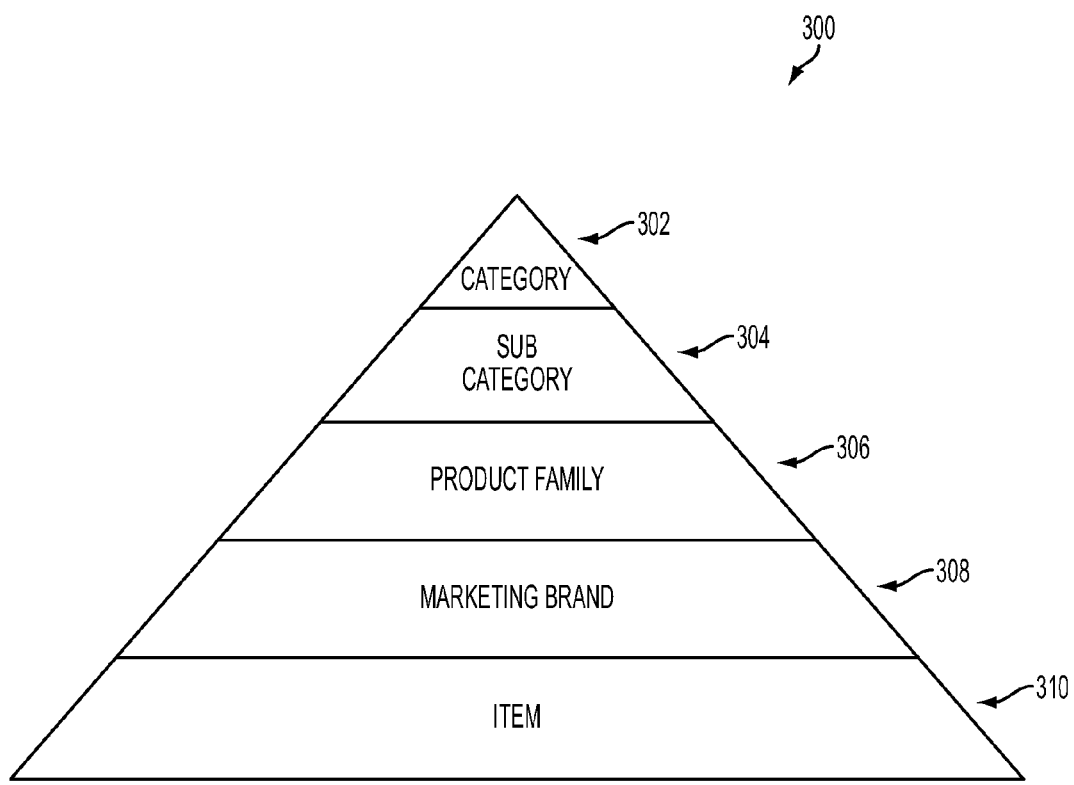
FIG. 3 illustrates an exemplary product-naming convention.

FIG. 3 illustrates an exemplary product-naming convention 300. The product-naming convention 300 is a tree structure that includes a category level 302, a sub-category level 304, a product-family level 306, a marketing-brand level 308, and an item level 310. In various embodiments, the product-naming convention 300 may be adapted for any class of products. FIGS. 3A-3D below describe an exemplary product-naming convention with respect to the beverage industry.

Figure 3A:
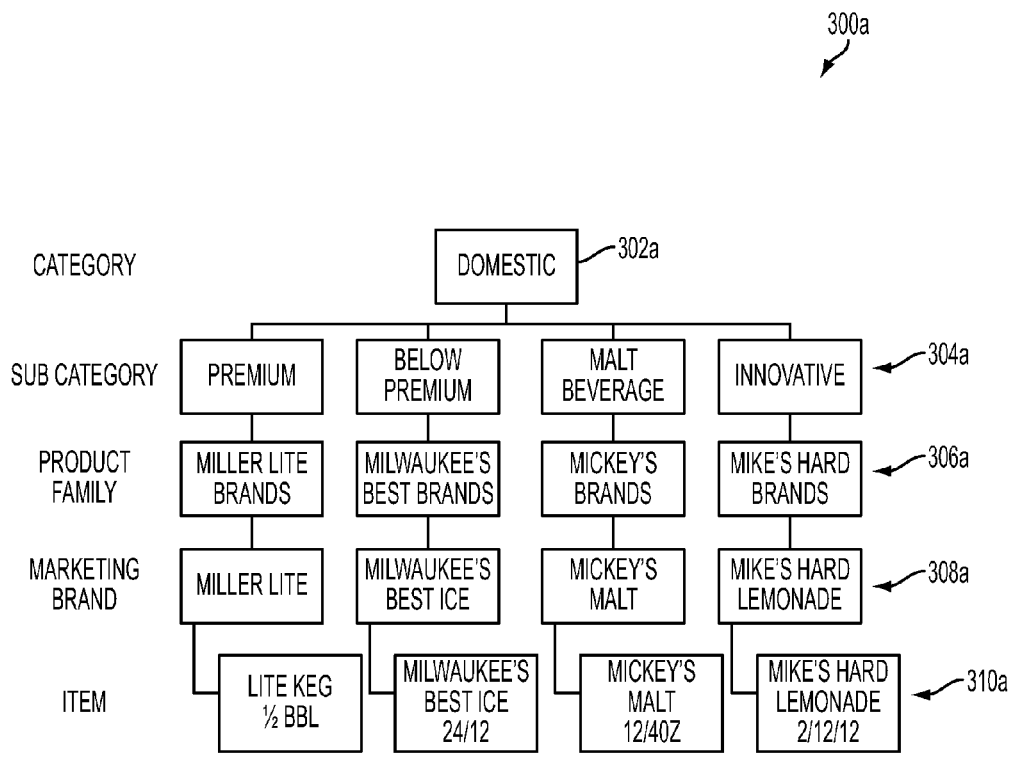
FIGS. 3A-3D describe an exemplary product-naming convention with respect to the beverage industry.

FIG. 3A illustrates a product tree 300a that begins with a product category 302a of "Domestic." Beneath the product category 302a are a sub-category level 304a, a product-family level 306a, a marketing-brand level 308a, and an item level 310a.

Figure 3B:
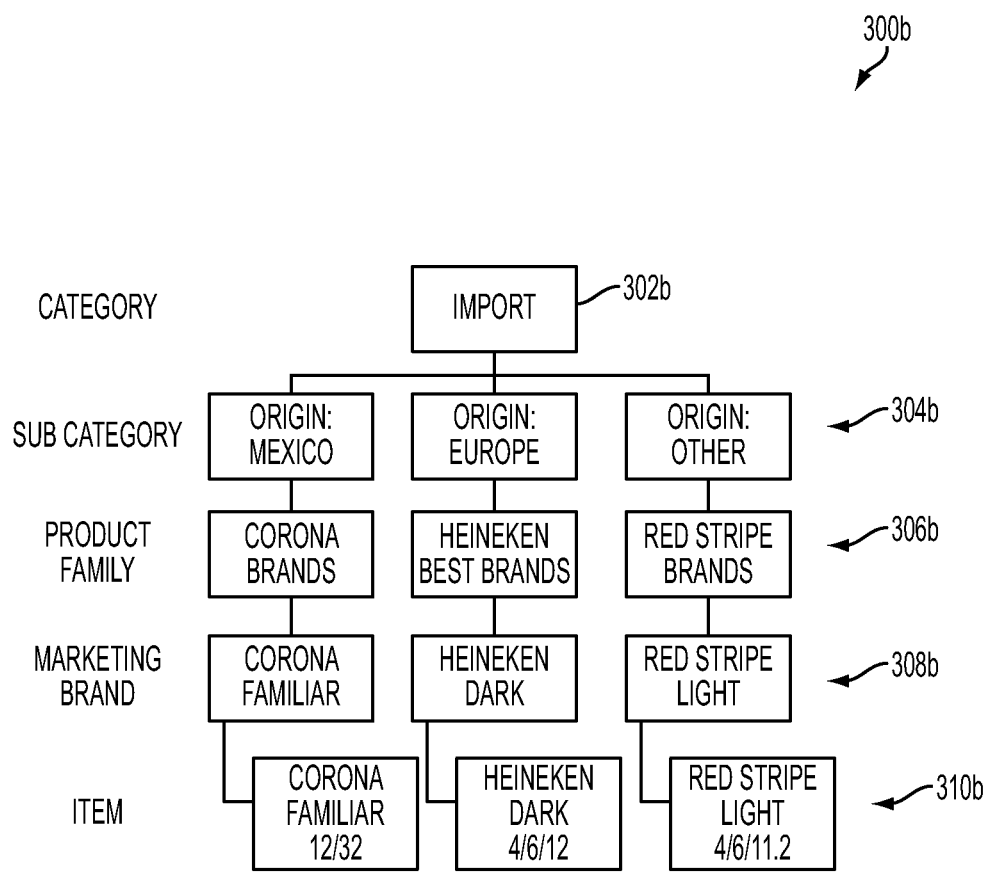

FIG. 3B illustrates a product tree 300b that begins with a product category 302b of "Import." Beneath the product category 302b are a sub-category level 304b, a product-family level 306b, a marketing-brand level 308b, and an item level 310b.

Figure 3C:
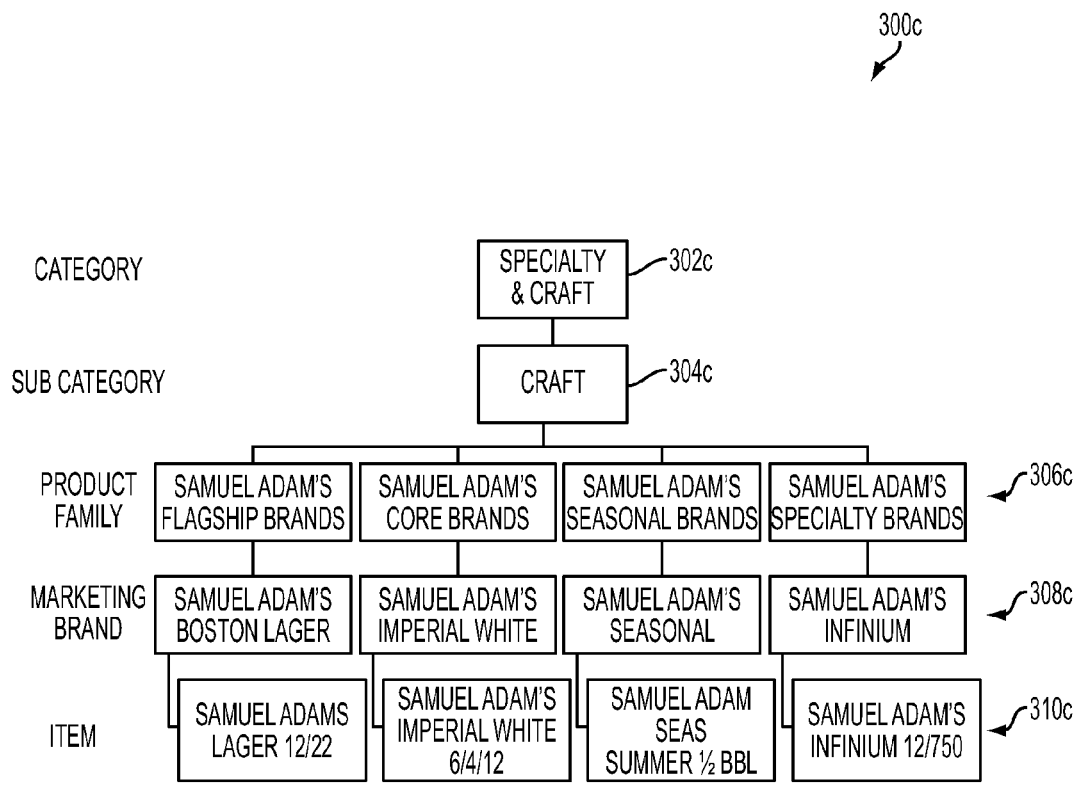

FIG. 3C illustrates a product tree 300c that begins with a product category 302c of "Specialty & Craft." Beneath the product category 302c are a sub-category level 304c, a product-family level 306c, a marketing-brand level 308c, and an item level 310c.

Figure 3D:
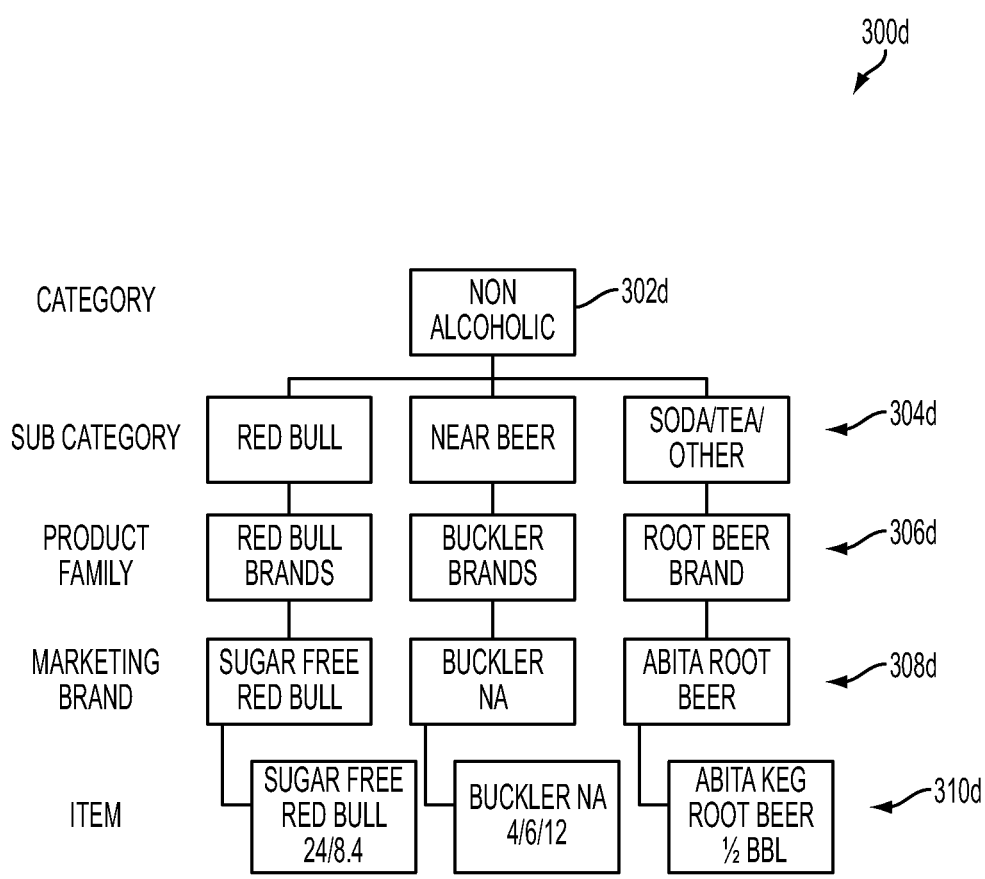

FIG. 3D illustrates a product tree 300d that begins with a product category 302d of "Non Alcoholic." Beneath the product category 302d are a sub-category level 304d, a product-family level 306d, a marketing-brand level 308d, and an item level 310d.

Table 1 below describes an exemplary retail-provider-type naming convention, an exemplary consumer-demographics naming convention, and exemplary model markets based on marketing data provided by the Nielsen Company. The examples provided in Table 1 are with respect to embodiments in which a product-optimization system such as, for example, the product-optimization system 100 of FIG. 1, is utilized in the beverage industry. Table 1 depicts the exemplary consumer-demographics naming convention via a plurality of consumer-demographics categories that are listed in the "Neighborhood" column. In particular, Table 1 lists six consumer-demographics categories of "Affluent Suburban Spreads," "Comfortable Country," "Cosmopolitan Centers," "Modest Working Towns," "Plain Rural Living," and "Struggling Urban Cores."

Table 1 below further describes the exemplary retail-provider-type naming convention in columns labeled "Premise-Type," "Channel," and "SubChannel." The exemplary retail-provider-type naming convention may be considered a tree that extends from a root to two premises types of "OffPremise" and "OnPremise." Each of the two premises types has a plurality of channels that is reflected in the "Channel" column. Each of the plurality of channels has a sub-channel that is reflected in the "SubChannel" column. Each line item in Table 1 is an intersection of the exemplary retail-provider-type naming convention and the consumer-demographics naming convention. Therefore, Table 1 may be considered a listing of model markets for the beverage industry. Each model market in Table 1 may include, for example, a plurality of retail providers.

TABLE 1

| Premise | Neighborhood | Channel | Sub Channel |
|---|---|---|---|
| OffPremise | Affluent Suburban Spreads | Convenience Store | Conventional Convenience |
| OffPremise | Affluent Suburban Spreads | Convenience Store | Gas Station Kiosk |
| OffPremise | Affluent Suburban Spreads | Dining | Casual Dining |
| OffPremise | Affluent Suburban Spreads | Drug | Conventional Drug |
| OffPremise | Affluent Suburban Spreads | Grocery | Supercenter |
| OffPremise | Affluent Suburban Spreads | Grocery | Superette |
| OffPremise | Affluent Suburban Spreads | Grocery | Supermarket-Conventional |
| OffPremise | Affluent Suburban Spreads | Grocery | Supermarket-Natural/Gourmet Foods |
| OffPremise | Affluent Suburban Spreads | Liquor | Beer Specialty Store |
| OffPremise | Affluent Suburban Spreads | Liquor | Conventional Liquor |
| OffPremise | Affluent Suburban Spreads | Liquor | Liquor Super Store |
| OffPremise | Affluent Suburban Spreads | Liquor | Wine Specialty Store |
| OffPremise | Affluent Suburban Spreads | Mass Merchandiser | Conventional Mass Merchandiser |
| OffPremise | Affluent Suburban Spreads | Wholesale Club | Conventional Wholesale Club |
| OffPremise | Comfortable Country | Convenience Store | Conventional Convenience |
| OffPremise | Comfortable Country | Drug | Conventional Drug |
| OffPremise | Comfortable Country | Grocery | Supercenter |
| OffPremise | Comfortable Country | Grocery | Supermarket-Conventional |
| OffPremise | Comfortable Country | Grocery | Supermarket-Natural/Gourmet Foods |
| OffPremise | Comfortable Country | Liquor | Beer Specialty Store |
| OffPremise | Comfortable Country | Liquor | Conventional Liquor |
| OffPremise | Comfortable Country | Liquor | Liquor Super Store |
| OffPremise | Comfortable Country | Mass Merchandiser | Conventional Mass Merchandiser |
| OffPremise | Comfortable Country | Wholesale Club | Conventional Wholesale Club |
| OffPremise | Cosmopolitan Centers | Bar/Nightclub | Neighborhood Bar |
| OffPremise | Cosmopolitan Centers | Convenience Store | Conventional Convenience |
| OffPremise | Cosmopolitan Centers | Dining | Casual Dining |
| OffPremise | Cosmopolitan Centers | Drug | Conventional Drug |
| OffPremise | Cosmopolitan Centers | Grocery | Supercenter |
| OffPremise | Cosmopolitan Centers | Grocery | Superette |
| OffPremise | Cosmopolitan Centers | Grocery | Supermarket-Conventional |
| OffPremise | Cosmopolitan Centers | Grocery | Supermarket-Conventional |
| OffPremise | Cosmopolitan Centers | Grocery | Warehouse Grocery |
| OffPremise | Cosmopolitan Centers | Liquor | Conventional Liquor |
| OffPremise | Cosmopolitan Centers | Liquor | Liquor Super Store |
| OffPremise | Cosmopolitan Centers | Liquor | Wine Specialty Store |
| OffPremise | Cosmopolitan Centers | Mass Merchandiser | Conventional Mass Merchandiser |
| OffPremise | Cosmopolitan Centers | Wholesale Club | Conventional Wholesale Club |
| OffPremise | Modest Working Towns | Bar/Nightclub | Neighborhood Bar |
| OffPremise | Modest Working Towns | Convenience Store | Conventional Convenience |
| OffPremise | Modest Working Towns | Dining | Casual Dining |
| OffPremise | Modest Working Towns | Drug | Conventional Drug |
| OffPremise | Modest Working Towns | Master Off Premise | Small Grocery |
| OffPremise | Modest Working Towns | Grocery | Supercenter |
| OffPremise | Modest Working Towns | Grocery | Superette |
| OffPremise | Modest Working Towns | Grocery | Supermarket-Conventional |
| OffPremise | Modest Working Towns | Grocery | Supermarket-Limil4d Assortment |
| OffPremise | Modest Working Towns | Grocery | Supermarket-Natural/Gourmet Foods |
| OffPremise | Modest Working Towns | Liquor | Beer Specialty Store |
| OffPremise | Modest Working Towns | Liquor | Conventional Liquor |
| OffPremise | Modest Working Towns | Liquor | Liquor Super Store |
| OffPremise | Modest Working Towns | Mass Merchandiser | Conventional Mass Merchandiser |
| OffPremise | Modest Working Towns | Wholesale Club | Conventional Wholesale Club |
| OffPremise | Plain Rural Living | Convenience Store | Conventional Convenience |
| OffPremise | Plain Rural Living | Dining | Casual Dining |
| OffPremise | Plain Rural Living | Drug | Conventional Drug |
| OffPremise | Plain Rural Living | Grocery | Supercenter |
| OffPremise | Plain Rural Living | Grocery | Superette |
| OffPremise | Plain Rural Living | Grocery | Supermarket-Conventional |
| Off Premise | Plain Rural Living | Liquor | Beer Specialty Store |
| OffPremise | Plain Rural Living | Liquor | Conventional Liquor |
| OffPremise | Plain Rural Living | Lodging | Resort/Convention |
| OffPremise | Struggling Urban Cores | Bar/Nightclub | Casual Nightclub |
| OffPremise | Struggling Urban Cores | Bar/Nightclub | Neighborhood Bar |

TABLE 1-continued

| Premise | Neighborhood | Channel | Sub Channel |
|---|---|---|---|
| OffPremise | Struggling Urban Cores | Convenience Store | Conventional Convenience |
| OffPremise | Struggling Urban Cores | Dining | Casual Dining |
| OffPremise | Struggling Urban Cores | Drug | Conventional Drug |
| Off-Premise | Struggling Urban Cores | Extended Master Off-Premise | Other Off-Premise |
| OffPremise | Struggling Urban Cores | Grocery | Supercenter |
| OffPremise | Struggling Urban Cores | Grocery | Superette |
| OffPremise | Struggling Urban Cores | Grocery | Supermarket-Conventional |
| OffPremise | Struggling Urban Cores | Grocery | Supermarket-Limited Assortment |
| OffPremlse | Struggling Urban Cores | Grocery | Supermarket-Natural/Gourmet Foods |
| OffPremise | Struggling Urban Cores | Liquor | Conventional Liquor |
| OffPremise | Struggling Urban Cores | Liquor | Liquor Super Store |
| OffPremise | Struggling Urban Cores | Mass Merchandiser | Conventional Mass Merchandiser |
| OffPremise | Struggling Urban Cores | Wholesale Club | Conventional Wholesale Club |
| OnPremise | Affluent Suburban Spreads | Bar/Nightclub | Casual Nightclub |
| OnPremise | Affluent Suburban Spreads | Bar/Nightclub | Country Western |
| OnPremise | Affluent Suburban Spreads | Bar/Nightclub | fish Pub |
| OnPremise | Affluent Suburban Spreads | Bar/Nightclub | Neighborhood Bar |
| OnPremise | Affluent Suburban Spreads | Bar/Nightclub | Premium Bar |
| OnPremise | Affluent Suburban Spreads | Bar/Nightclub | Premium Nightclub |
| OnPremise | Affluent Suburban Spreads | Bar/Nightclub | Sports Bar |
| OnPremise | Affluent Suburban Spreads | Convenience Store | Conventional Convenience |
| OnPremise | Affluent Suburban Spreads | Dining | Casual Dining |
| OnPremise | Affluent Suburban Spreads | Dining | Fine Dining |
| OnPremise | Affluent Suburban Spreads | Dining | Theme Restaurant |
| OnPremise | Affluent Suburban Spreads | Extended Master Off-Premise | Other Off Premise |
| OnPremise | Affluent Suburban Spreads | Extended Master On-Premise | Restaurant NA |
| OnPremise | Affluent Suburban Spreads | Grocery | Supermarket-Conventional |
| OnPremise | Affluent Suburban Spreads | Liquor | Wine Specialty Store |
| OnPremise | Affluent Suburban Spreads | Lodging | Full Service Lodging |
| OnPremise | Affluent Suburban Spreads | Lodging | Luxury Lodging |
| OnPremise | Affluent Suburban Spreads | Lodging | Resort/Convention |
| OnPremise | Comfortable Country | Bar/Nightclub | Casual Nightclub |
| OnPremise | Comfortable Country | Bar/Nightclub | Country Western |
| OnPremise | Comfortable Country | Bar/Nightclub | Neighborhood Bar |
| OnPremise | Comfortable Country | Bar/Nightclub | Sports Bar |
| OnPremise | Comfortable Country | Dining | Casual Dining |
| OnPremise | Comfortable Country | Dining | Fine Dining |
| OnPremise | Cosmopolitan Centers | Bar/Nightclub | Adult Entertainment |
| OnPremise | Cosmopolitan Centers | Bar/Nightclub | Casual Nightclub |
| OnPremise | Cosmopolitan Centers | Bar/Nightclub | Country Western |
| OnPremise | Cosmopolitan Centers | Bar/Nightclub | Irish Pub |
| OnPremise | Cosmopolitan Centers | Bar/Nightclub | Neighborhood Bar |
| OnPremise | Cosmopolitan Centers | Bar/Nightclub | Sports Bar |
| OnPremise | Cosmopolitan Centers | Dining | Casual Dining |
| OnPremise | Cosmopolitan Centers | Dining | Fine Dining |
| OnPremise | Cosmopolitan Centers | Dining | Theme Restaurant |
| OnPremise | Cosmopolitan Centers | Liquor | Conventional Liquor |
| OnPremise | Cosmopolitan Centers | Liquor | Wine Specialty Store |
| OnPremise | Modest Working Towns | Bar/Nightclub | Adult Entertainment |
| OnPremise | Modest Working Towns | Bar/Nightclub | Casual Nightclub |
| OnPremise | Modest Working Towns | Bar/Nightclub | Country Western |
| OnPremise | Modest Working Towns | Bar/Nightclub | Irish Pub |
| OnPremise | Modest Working Towns | Bar/Nightclub | Neighborhood Bar |
| OnPremise | Modest Working Towns | Bar/Nightclub | Sports Bar |
| OnPremise | Modest Working Towns | Dining | Casual Dining |
| OnPremise | Modest Working Towns | Dining | Fine Dining |
| OnPremise | Modest Working Towns | Extended Master On-Premise | Restaurant NA |
| OnPremise | Modest Working Towns | Lodging | Full Service Lodging |
| OnPremise | Modest Working Towns | Lodging | Luxury Lodging |
| OnPremise | Plain Rural Living | Bar/Nightclub | Casual Nightclub |
| OnPremise | Plain Rural Living | Bar/Nightclub | Country Western |
| OnPremise | Plain Rural Living | Bar/Nightclub | Neighborhood Bar |
| OnPremise | Plain Rural Living | Dining | Casual Dining |
| OnPremise | Struggling Urban Cores | Bar/Nightclub | Adult Entertainment |
| OnPremise | Struggling Urban Cores | Bar/Nightclub | Casual Nightclub |
| OnPremise | Struggling Urban Cores | Bar/Nightclub | Country Western |
| OnPremise | Struggling Urban Cores | Bar/Nightclub | Neighborhood Bar |
| OnPremise | Struggling Urban Cores | Bar/Nightclub | Sports Bar |
| OnPremise | Struggling Urban Cores | Dining | Casual Dining |
| OnPremise | Struggling Urban Cores | Dining | Fine Dining |
| OnPremise | Struggling Urban Cores | Dining | Theme Restaurant |
| OnPremise | Struggling Urban Cores | Grocery | Superette |
| OnPremise | Struggling Urban Cores | Grocery | Supermarket-Conventional |
| OnPremise | Struggling Urban Cores | Liquor | Wine Specialty Store |
| OnPremise | Struggling Urban Cores | Lodging | Full Service Lodging |
| OnPremise | Struggling Urban Cores | Lodging | Luxury Lodging |
| OnPremise | Struggling Urban Cores | Recreation | Billiard/Bowling/Arcade |

Figure 4:
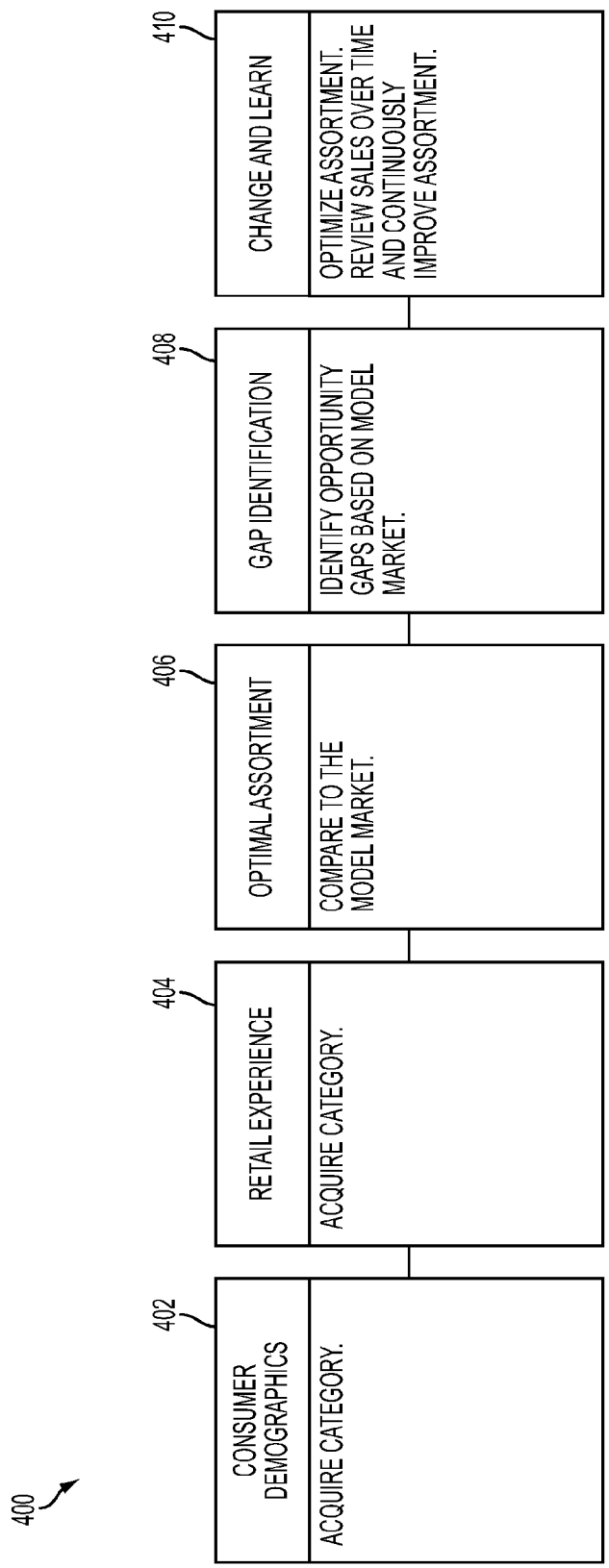
FIG. 4 illustrates a product-optimization process.

FIG. 4 illustrates a product-optimization process 400 that may be executed, for example, via the product-optimization system 100 of FIG. 1. In a typical embodiment, the product-optimization process 400 is used by a retail provider (or a distributor) to optimize an assortment of products being sold by the retail provider. The process 400 begins with step 402.

At step 402, a consumer-demographics category for the retail provider is acquired. In a typical embodiment, the consumer-demographics category for the retail provider is stored, for example, by the product analytics database 106 of FIG. 1 according to the consumer-demographics naming convention. From step 402, the process 400 proceeds to step 404. At step 404, a retail-provider-type category for the retail provider is acquired. In a typical embodiment, the retail-provider-type category for the retail provider is stored, for example, by the product analytics database 106 of FIG. 1 according to the retail-provider-type naming convention. From step 404, the process 400 proceeds to step 406.

At step 406, an optimal assortment of products for the retail provider is identified. In a typical embodiment, the retail-provider-type category acquired at step 404 and the consumer-demographics category acquired at step 402 define a model market. The optimal assortment is generally identified via a comparison of product sales among other retail providers in the model market. The product sales that are compared are typically identified according to a product-naming convention such as, for example, the product-naming convention implemented by the product-optimization system 100 of FIG. 1. The optimal assortment generally includes top selling products within the model market as defined, for example, by rates of sale or volume per outlet (VPO). From step 406, the process 400 proceeds to step 408.

At step 408, a current product assortment for the retail provider is compared with the optimal assortment. As part of step 408, differences between the current product assortment and the optimal product assortment are generally determined (i.e. gap identification). From step 408, the process 400 proceeds to step 410. At step 410, the retail provider (or distributor) acts on the optimal assortment, for example, by adding products from the optimal assortment to the products being offered for sale by the retail provider. The retail may also review sales and the assortment of products being offered for sale as part of a continual improvement process. From step 410, the process 400 ends.

Figure 5:
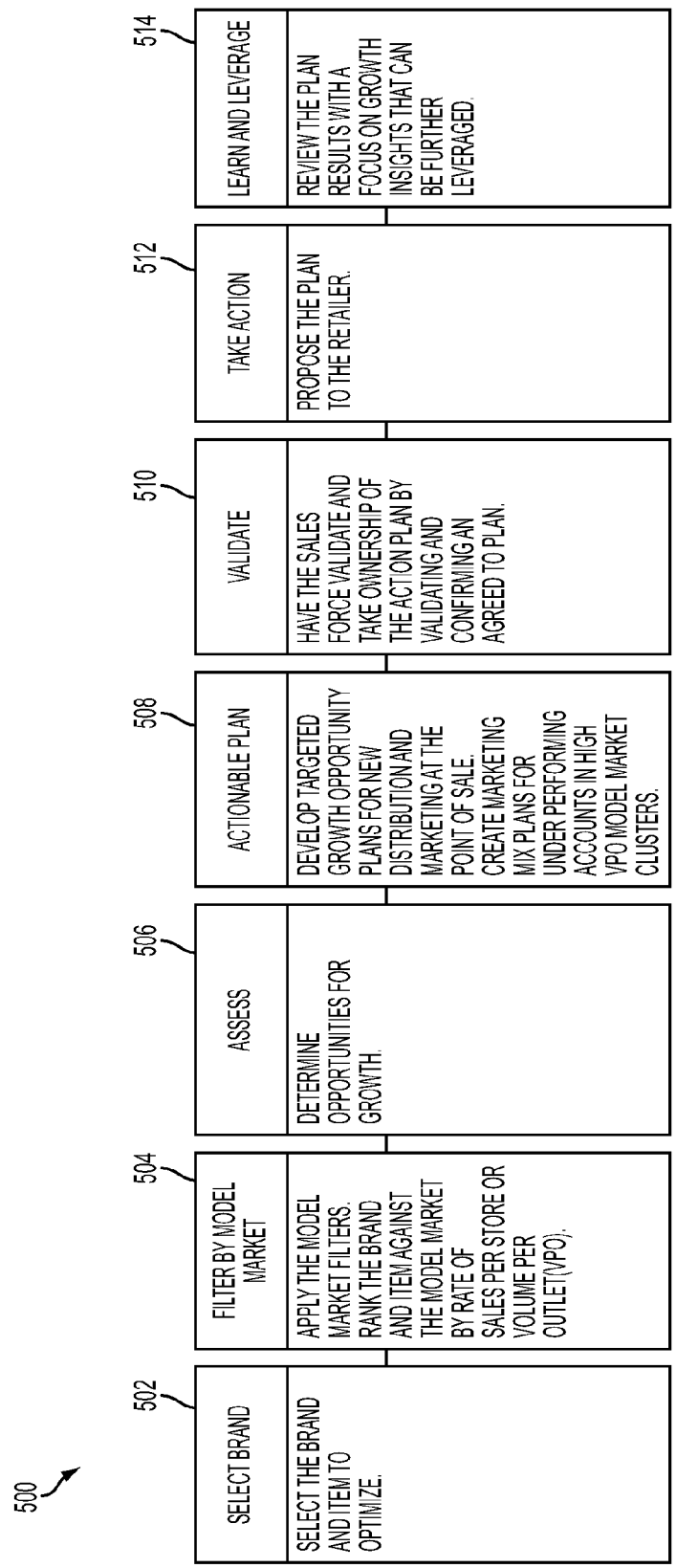
FIG. 5 illustrates a brand-optimization process for an existing product.

FIG. 5 illustrates a brand-optimization process 500 that may be executed via, for example, the product-optimization system 100 of FIG. 1. In a typical embodiment, the brand-optimization process 500 is used by a manufacturer or producer of a product or a distributor of a product to optimize sales of an existing product. The brand-optimization process 500 begins with step 502.

At step 502, the existing product is selected via a product-naming convention such as, for example, the product-naming convention implemented by the product-optimization system 100 of FIG. 1. For example, with respect to FIG. 3, the existing product may be selected at the item level 310. From step 502, the process 500 proceeds to step 504. At step 504, sales of the existing product are filtered according to model market. For example, model markets may be listed and sorted by rate of sales per store or VPO. From step 504, the process 500 proceeds to step 506. At step 506, the model markets are assessed. Model-market assessment typically involves identifying retail providers in top model markets (e.g., model markets having a high rate of sales or VPO) that do not currently sell the existing product (i.e., unpenetrated retail providers) or are greatly underperforming relative to an applicable top model market as a whole (i.e. underperforming retail providers). From step 506, the process 500 proceeds to step 508.

At step 508, an actionable plan is developed. With respect to the unpenetrated retail providers and the underperforming retail providers identified at step 506, the actionable plan typically specifies steps designed to extend the existing product's distribution and/or improve product marketing. From step 508, the process 500 proceeds to step 510. At step 510, the actionable plan is validated by sales staff. From step 510, the process 500 proceeds to step 512. At step 512, the actionable plan is implemented via proposals to the underperforming retail providers and the unpenetrated retail providers. Each proposal can include, for example, rates of sale and VPO for the model market to which a particular underperforming or unpenetrated retail provider belongs. Each proposal can further include projected profit gains. From step 512, the process 500 proceeds to step 514. At step 514, results of the actionable plan are reviewed and monitored for additional growth opportunities. From step 514, the process 500 ends.

Figure 6:
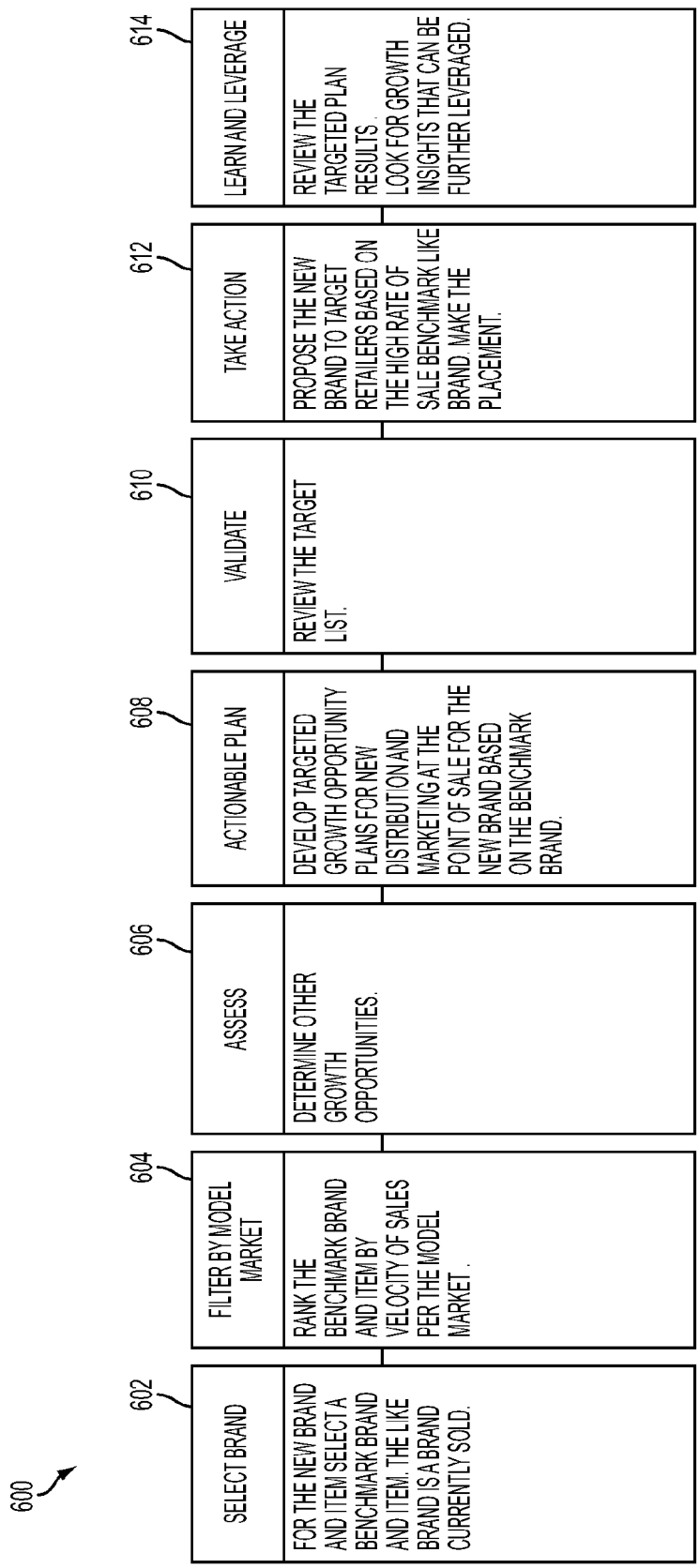
FIG. 6 illustrates a brand-optimization process for a new product.

FIG. 6 illustrates a brand-optimization process 600 that may be executed via, for example, the product-optimization system 100 of FIG. 1. In a typical embodiment, the brand-optimization process 600 is used, for example, by a manufacturer or producer of a product or a distributor of a product, to optimize sales of a new product. The brand-optimization process 600 begins at step 602.

At step 602, a benchmark product is selected from among existing products that are described by a product-naming convention such as, for example, the product-naming convention implemented by the product-optimization system 100 of FIG. 1. For example, with respect to FIG. 3, the benchmark product may be selected at the item level 310. The benchmark product is generally a product that is considered to be comparable to the new product. From step 602, the process 600 proceeds to step 604. At step 604, sales of the benchmark product are filtered according to model market. For example, model markets may be listed and sorted by rate of sales per store or VPO. The model markets may also be compared by way of a graph that depicts a distribution curve. Model markets having a high rate of sales or VPO relative to others may be considered top model markets. Top retail providers within the top model markets may represent an initial target list for the new product. From step 604, the process 600 proceeds to step 606. At step 606, the model markets (and its retail providers) are assessed. Assessment typically involves identifying additional retail providers for the initial target list that do not currently sell the benchmark product (i.e., unpenetrated retail providers). From step 606, the process 600 proceeds to step 608.

At step 608, an actionable plan is developed. The actionable plan typically specifies steps designed to market the new product to the retail providers in the initial target list. From step 608, the process 600 proceeds to step 610. At step 610, the actionable plan is validated by sales staff. From step 610, the process 600 proceeds to step 612. At step 612, the actionable plan is implemented via proposals to retail providers on the initial target list. Each proposal can include, for example, rates of sale and VPO for the benchmark product in a model market to which a particular retail provider belongs. Each proposal can further include projected profit gains for the new product. From step 612, the process 600 proceeds to step 614. At step 614, results of the actionable plan are reviewed and monitored for growth opportunities. From step 614, the process 600 ends.

Figure 7:
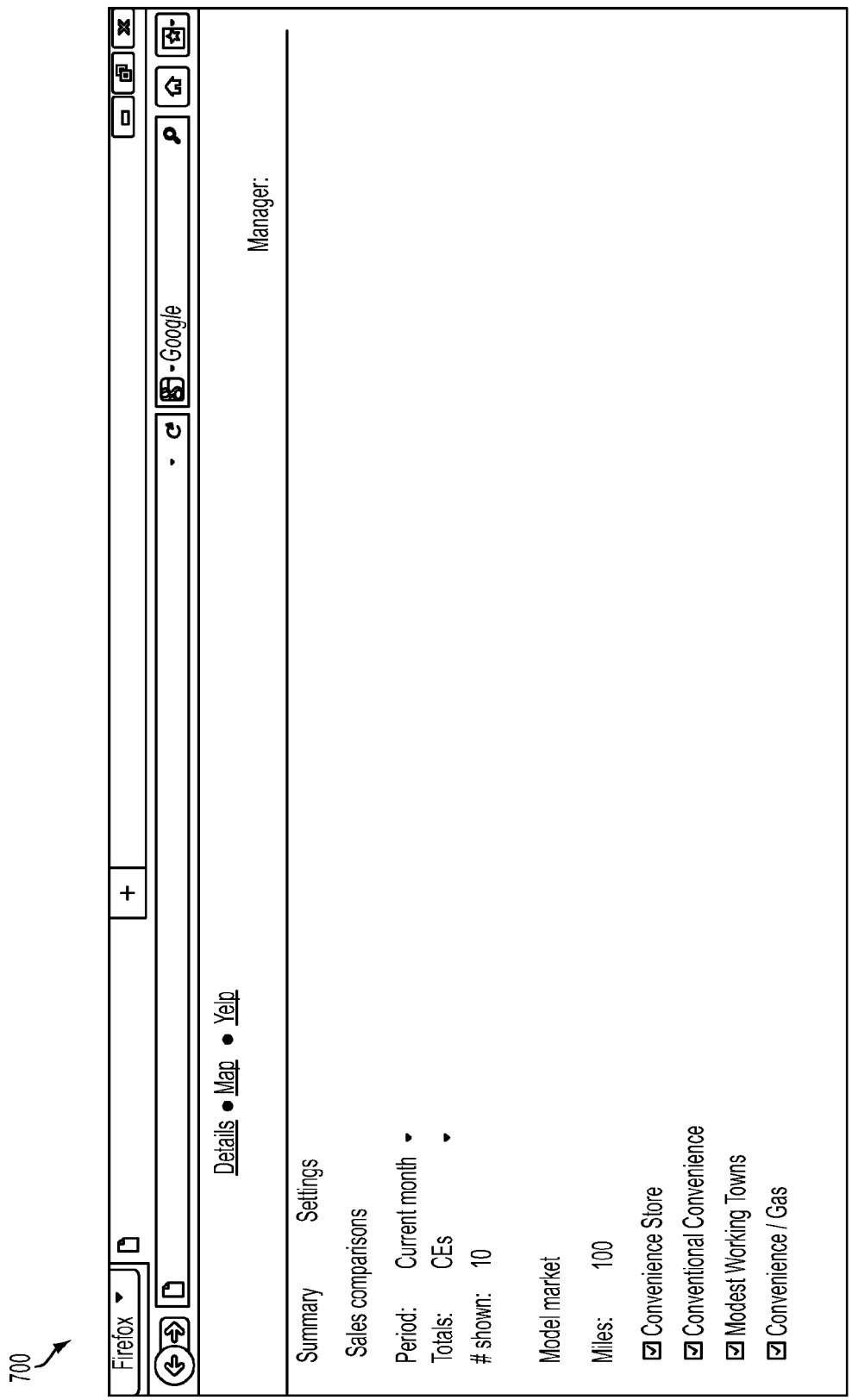
FIG. 7 illustrates an exemplary user interface.

FIG. 7 illustrates an exemplary user interface 700 that may be used to select a model market for purposes of a product-optimization process such as, for example, the product-optimization processes 400, 500, and 600 that were described with respect to FIGS. 4, 5, and 6, respectively. The user interface can be presented, for example, on one of the plurality of client computing devices 112 of FIG. 1 or via the website 110 of FIG. 1. The user interface 700 illustrates a model market defined by a consumer-demographics category of "Modest Working Towns" and retail-provider-type categories of "Convenience/Gas" and "Conventional Convenience." The retail-provider-type categories of "Convenience/Gas" and "Conventional Convenience" fall under a broader retail-provider-type category of "Convenience Store."

Figure 8:
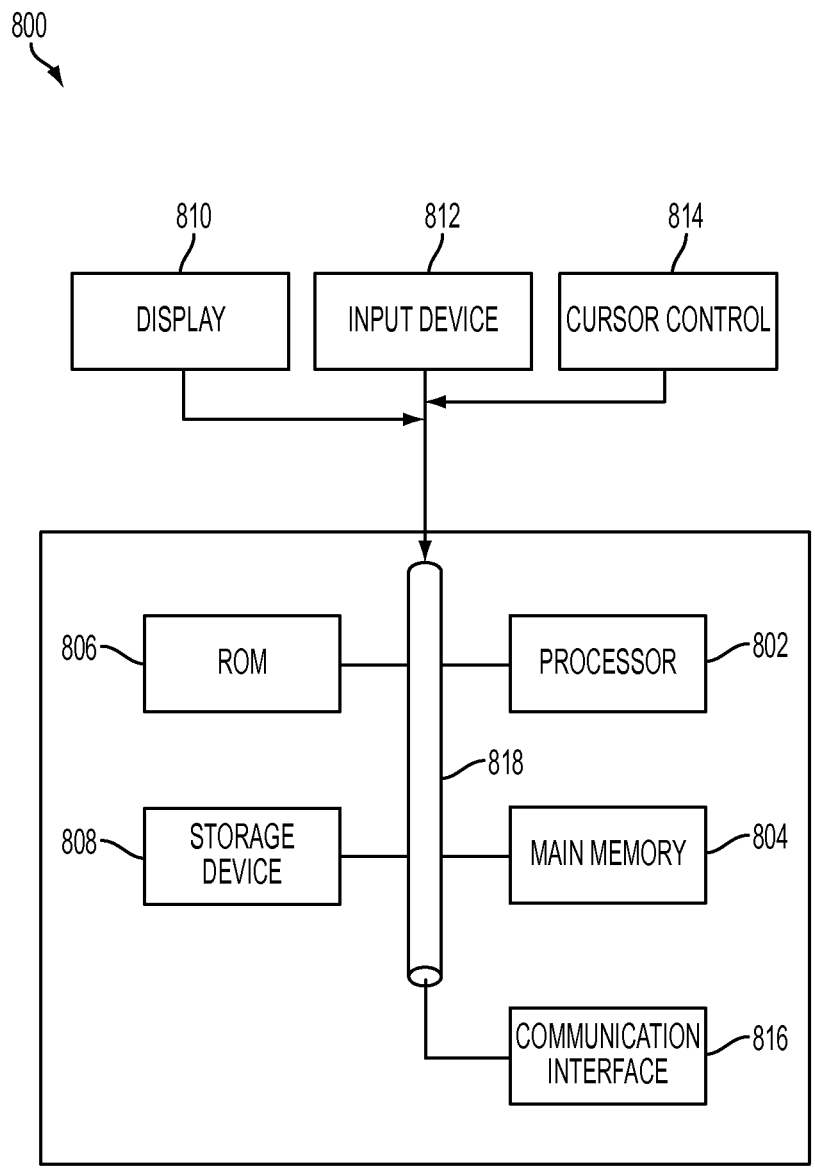
FIG. 8 illustrates an embodiment of a computer system.

FIG. 8 illustrates an embodiment of a computer system 800 on which various embodiments of the invention may be implemented such as, for example, the product-optimization system 100 of FIG. 1. For example, the computer system 800 can be used to implement functionality attributed to the sales database 102 of FIG. 1, the product analytics database 106 of FIG. 1, and/or by server computers coupled to and in data communication therewith. In the implementation, a computer system 800 may include a bus 818 or other communication mechanism for communicating information and a processor 802 coupled to the bus 818 for processing information. The computer system 800 also includes a main memory 804, such as random-access memory (RAM) or other dynamic storage device, coupled to the bus 818 for storing computer readable instructions by the processor 802.

The main memory 804 also may be used for storing temporary variables or other intermediate information during execution of the instructions to be executed by the processor 802. The computer system 800 further includes a read-only memory (ROM) 806 or other static storage device coupled to the bus 818 for storing static information and instructions for the processor 802. A computer-readable storage device 808, such as a magnetic disk or optical disk, is coupled to the bus 818 for storing information and instructions for the processor 802. The computer system 800 may be coupled via the bus 818 to a display 810, such as a liquid crystal display (LCD) or a cathode ray tube (CRT), for displaying information to a user. An input device 812, including, for example, alphanumeric and other keys, is coupled to the bus 818 for communicating information and command selections to the processor 802. Another type of user input device is a cursor control 814, such as a mouse, a trackball, or cursor direction keys for communicating direct information and command selections to the processor 802 and for controlling cursor movement on the display 810. The cursor control 814 typically has two degrees of freedom in two axes, a first axis (e.g., x) and a second axis (e.g., y), that allow the device to specify positions in a plane.

The term "computer readable instructions" as used above refers to any instructions that may be performed by the processor 802 and/or other component of the computer system 800. Similarly, the term "computer readable medium" refers to any storage medium that may be used to store the computer readable instructions. Such a medium may take many forms, including, but not limited to, non-volatile media, volatile media, and transmission media. Non-volatile media include, for example, optical or magnetic disks, such as the storage device 808. Volatile media includes dynamic memory, such as the main memory 804. Transmission media includes coaxial cables, copper wire, and fiber optics, including wires of the bus 818. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 802 for execution. For example, the instructions may initially be borne on a magnetic disk of a remote computer. The remote computer can load the instructions into its dynamic memory and send the instructions over a telephone line using a modem. A modem local to the computer system 800 can receive the data on the telephone line and use an infrared transmitter to convert the data to an infrared signal. An infrared detector coupled to the bus 818 can receive the data carried in the infrared signal and place the data on the bus 818. The bus 818 carries the data to the main memory 804, from which the processor 802 retrieves and executes the instructions. The instructions received by the main memory 804 may optionally be stored on the storage device 808 either before or after execution by the processor 802.

The computer system 800 may also include a communication interface 816 coupled to the bus 818. The communication interface 816 provides a two-way data communication coupling between the computer system 800 and a network. For example, the communication interface 816 may be an integrated services digital network (ISDN) card or a modem used to provide a data communication connection to a corresponding type of telephone line. As another example, the communication interface 816 may be a local area network (LAN) card used to provide a data communication connection to a compatible LAN. Wireless links may also be implemented. In any such implementation, the communication interface 816 sends and receives electrical, electromagnetic, optical, or other signals that carry digital data streams representing various types of information. The storage device 808 can further include instructions for carrying out various processes for image processing as described herein when executed by the processor 802. The storage device 808 can further include a database for storing data relative to same.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   in a database, maintaining multiple-indexed data according to a data model comprising a plurality of distinct naming conventions, the plurality of distinct naming conventions comprising a first naming convention, a second naming convention, and a third naming convention;
   wherein the multiple-indexed data comprises:
      information of interest in relation to first data and second data;
      first descriptive information in relation to the first data, the first descriptive information categorizing the first data in conformance to the first naming convention;
      second descriptive information in relation to the first data, the second descriptive information categorizing the first data in conformance to the second naming convention; and third descriptive information in relation to the second data, the third descriptive information categorizing the second data in conformance to the third naming convention;

wherein the maintaining comprises indexing the multiple-indexed data at least by the first descriptive information, the second descriptive information and the third descriptive information;

periodically receiving, by a server computer over a computer network, raw data, the raw data comprising new information of interest, new first data and new second data;

responsive to the periodically receiving, translating, by the server computer, the raw data into the data model, the translating comprising:

determining new first descriptive information in relation to the new first data, the new first descriptive information categorizing the new first data in conformance to the first naming convention;

determining new second descriptive information in relation to the new first data, the new second descriptive information categorizing the new first data in conformance to the second naming convention; and determining new third descriptive information in relation to the new second data, the new third descriptive information categorizing the new second data in conformance to the third naming convention;

storing the translated raw data as part of the multiple-indexed data, the storing comprising storing the new information of interest, the new first data, the new second data, the new first descriptive information, the new second descriptive information and the new third descriptive information as part of the information of interest, the first data, the second data, the first descriptive information, the second descriptive information and the third descriptive information, respectively;

receiving, by the server computer over the computer network, a request for computer analysis of the information of interest in relation to an intersection of the first naming convention and the second naming convention;

responsive to the request, the server computer aggregating at least a portion of the multiple-indexed data based at least in part on an intersection of the first descriptive information and the second descriptive information;

responsive to the aggregating, identifying an optimal intersection of the first descriptive information, the second descriptive information and the third descriptive information relative to the information of interest; and providing information related to the optimal intersection to a requestor.

2. The method of claim 1, wherein the first naming convention, the second naming convention and the third naming convention each comprise a plurality of categories.

3. The method of claim 2, wherein the receiving of the request comprises:

acquiring a category of the first naming convention; and
acquiring a category of the second naming convention.

4. The method of claim 3, the method comprising:

facilitating comparison of the optimal intersection with other data of the multiple-indexed data.

5. The method of claim 2, the method comprising:

sorting the aggregated at least a portion of the multiple-indexed data by information related to the information of interest.

6. The method of claim 5, comprising performing a gap analysis.

7. The method of claim 2, wherein the first naming convention, the second naming convention, and the third naming convention are each expressed as a tree structure.

8. The method of claim 7, wherein at least one naming convention of the plurality of distinct naming conventions comprises a plurality of levels.

9. A system comprising:

a database that maintains multiple-indexed data, the multiple-indexed data being maintained according to a data model comprising a plurality of distinct naming conventions, the plurality of distinct naming conventions comprising a first naming convention, a second naming convention, and a third naming convention;

wherein the multiple-indexed data comprises:

information of interest in relation to first data and second data;

first descriptive information in relation to the first data, the first descriptive information categorizing the first data in conformance to the first naming convention;

second descriptive information in relation to the first data, the second descriptive information categorizing the first data in conformance to the second naming convention; and third descriptive information in relation to the second data, the third descriptive information categorizing the second data in conformance to the third naming convention wherein the multiple-indexed data is indexed at least by the first descriptive information, the second descriptive information and the third descriptive information;

a server computer in data communication with the database, wherein the server computer is operable to:

periodically receive raw data over a computer network, the raw data comprising new information of interest, new first data and new second data;

translate the raw data into the data model, the translation comprising:

determination of new first descriptive information in relation to the new first data, the new first descriptive information categorizing the new first data in conformance to the first naming convention;

determination of new second descriptive information in relation to the new first data, the new second descriptive information categorizing the new first data in conformance to the second naming convention; and determination of new third descriptive information in relation to the new second data, the new third descriptive information categorizing the new second data in conformance to the third naming convention;

store the translated raw data as part of the multiple-indexed data, the storage comprising storage of the new information of interest, the new first data, the new second data, the new first descriptive information, the new second descriptive information and the new third descriptive information as part of the information of interest, the first data, the second data, the first descriptive information, the second descriptive information and the third descriptive information, respectively;

receive, over the computer network, a request for computer analysis of the information of interest in relation to an intersection of the first naming convention and the second naming convention;

responsive to the request, aggregate at least a portion of the multiple-indexed data based at least in part on an intersection of the first descriptive information and the second descriptive information; responsive to the aggregation, identify an optimal intersection of the first descriptive information, the second descriptive information and the third descriptive information relative to the information of interest; and provide information related to the optimal intersection to a requestor.

10. The system of claim 9, wherein the first naming convention, the second naming convention and the third naming convention each comprise a plurality of categories.

11. The system of claim 10, wherein the receipt of the request comprises:

acquisition of a category of the first naming convention; and acquisition of a category of the second naming convention.

12. The system of claim 11, wherein the server computer is operable to:

facilitate comparison of the optimal intersection with other data of the multiple-indexed data.

13. The system of claim 10, the system comprising:

wherein the server computer is operable to sort the aggregated at least a portion of the multiple-indexed data by information related to the information of interest.

14. The system of claim 13, wherein the server computer is operable to perform a gap analysis.

15. The system of claim 10, wherein the first naming convention, the second naming convention, and the third naming convention are each expressed as a tree structure.

16. The system of claim 15, wherein at least one naming convention of the plurality of distinct naming conventions comprises a plurality of levels.

17. The system of claim 9, wherein the system comprises a plurality of databases.

18. A computer-program product comprising a non-transitory computer-usable medium having computer-readable program code embodied therein, the computer-readable program code adapted to be executed to implement a method comprising:

maintaining multiple-indexed data according to a data model comprising a plurality of distinct naming conventions, the plurality of distinct naming conventions comprising a first naming convention, a second naming convention, and a third naming convention;

wherein the multiple-indexed data comprises:

information of interest in relation to first data and second data;

first descriptive information in relation to the first data, the first descriptive information categorizing the first data in conformance to the first naming convention;

second descriptive information in relation to the first data, the second descriptive information categorizing the first data in conformance to the second naming convention; and third descriptive information in relation to the second data, the third descriptive information categorizing the second data in conformance to the third naming convention;

wherein the maintaining comprises indexing the information of interest at least by the first descriptive information, the second descriptive information and the third descriptive information;

periodically receiving raw data over a computer network, the raw data comprising new information of interest, new first data and new second data;

responsive to the periodically receiving, translating the raw data into the data model, the translating comprising:

determining new first descriptive information in relation to the new first data, the new first descriptive information categorizing the new first data in conformance to the first naming convention;

determining new second descriptive information in relation to the new first data, the new second descriptive information categorizing the new first data in conformance to the second naming convention; and determining new third descriptive information in relation to the new second data, the new third descriptive information categorizing the new second data in conformance to the third naming convention;

storing the translated raw data as part of the multiple-indexed data, the storing comprising storing the new information of interest, the new first data, the new second data, the new first descriptive information, the new second descriptive information and the new third descriptive information as part of the information of interest, the first data, the second data, the first descriptive information, the second descriptive information and the third descriptive information, respectively;

receiving, over the computer network, a request for computer analysis of the information of interest in relation to an intersection of the first naming convention and the second naming convention;

responsive to the request, aggregating at least a portion of the multiple-indexed data based at least in part on an intersection of the first descriptive information and the second descriptive information;

responsive to the aggregating, identifying an optimal intersection of the first descriptive information, the second descriptive information and the third descriptive information relative to the information of interest; and providing information related to the optimal intersection to a requestor.

* * * * *